United States Patent
Roy et al.

(10) Patent No.: US 6,363,403 B1
(45) Date of Patent: Mar. 26, 2002

(54) GARBAGE COLLECTION IN OBJECT ORIENTED DATABASES USING TRANSACTIONAL CYCLIC REFERENCE COUNTING

(75) Inventors: Prasan Roy, Bombay (IN); Srinivasan Seshadri, Brasking Ridge; Abraham Silberschatz, Warren, both of NJ (US); Sundararajarao Sudarshan, Bombay (IN)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/345,826

(22) Filed: Jun. 30, 1999

(51) Int. Cl.[7] .............................................. G06F 17/30
(52) U.S. Cl. .................................. 707/206; 707/103 Y
(58) Field of Search ............................ 707/206, 103 Y; 709/223, 225; 711/161; 714/37

(56) References Cited

U.S. PATENT DOCUMENTS

| | | | |
|---|---|---|---|
| 4,775,932 A | * 10/1988 | Oxley et al. | 707/206 |
| 5,241,673 A | 8/1993 | Schelvis | 707/103 |
| 5,321,834 A | * 6/1994 | Weiseret et al. | 707/206 |
| 5,398,334 A | * 3/1995 | Topka et al. | 707/206 |
| 5,485,613 A | 1/1996 | Engelstad et al. | 707/1 |
| 5,560,003 A | 9/1996 | Nilsen et al. | 707/1 |
| 5,848,423 A | 12/1998 | Ebrahim et al. | 707/206 |
| 5,900,001 A | 5/1999 | Wolczko et al. | 707/206 |
| 6,199,075 B1 | * 3/2001 | Ungar et al. | 707/206 |

OTHER PUBLICATIONS

Practical distributed garbage collection for networks asynchronous clocks and message delay by Goug Kwan et al. (IEEE publication), in Paralel and Distributed Systems (Dec. 1994), pp. 406–411.*

Distributed/concurrent garbage collection in distributed memory systems by R. Kordale et al. (IEEE publication) in Object Orientation in Operating Systems (Dec. 1993), pp. 51–60.*

Incremental garbage collection in massive object storage by F. Brown (IEEE publication) in Computer Science Conference, (Feb. 2001) pp. 38–46.*

S. Ashwin et al., Garbage Collection in Object Oriented Databases Using Transactional Cyclic Reference Counting, Proceedings of the 23rd VLDB Conference, Athens Greece, 1997, 10 pages.

* cited by examiner

*Primary Examiner*—Diane D. Mizrahi

(57) ABSTRACT

A reference counting a garbage collection process employs a reference counting technique in which only the "last" detected strong pointer is followed to an object. Moreover, no assumptions are made about the phase locking used in the transaction and strict WAL is not followed. Indeed, a relatively restricted local traversal of the object graph is employed which leads to higher efficiency. Furthermore, in a client-server arrangement, updates made by a transaction running at the client may be reflected at the server after the transaction ends, and the updates are not required to be forced to the server before the end of the transaction.

38 Claims, 7 Drawing Sheets

OBJECT GRAPH

```
Procedure RedTraverse(oid)
Input: oid: (oid of) the object to be traversed
{
    if oid is not in RRT
        InsertRRT(oid)
    Traverse(oid)
}

Procedure Traverse(oid)
Input: oid: (oid of) the object to be traversed
{
    if oid is not in TRT {
        color oid red
        for each pointer oid ⟶ poid {
            if poid is not in RRT
                InsertRRT(poid)
            update S RedRef C_{poid} and W RedRef C_{poid}
                depending on the strength of oid ⟶ poid
            if S RedRef C_{poid} == S Ref C_{poid}
                /* this is the last strong pointer to poid */
                Traverse(poid)
        }
    }
}

Procedure InsertRRT(oid)
Input: oid: (oid of) the object to be inserted into RRT
{
    color oid blue
    insert oid into RRT
        with S RedRef C_{oid} = W RedRef C_{oid} = 0
    cache current values of S Ref C and W Ref C for oid
                in S Ref C_{oid} and W Ref C_{oid} respectively
```

```
Procedure GreenTraverse(oid)
Input: oid: (oid of) the object to be traversed
{
    color oid green
    for all pointers oid ⟶ poid
        if poid is in RRT and is red{ if S Ref C_poid == 0
                    remove poid from WRT
                make oid ⟶ poid strong (if weak)
                get log_analyzer_latch
                update reference counts of poid
                release log_analyzer_latch
                GreenTraverse(poid)
        }else {
                make oid ⟶ poid weak (if strong)
                get log_analyzer_latch
                update reference counts of poid
                release log_analyzer_latch
                if S Ref C_poid == 0
                    insert poid into WRT
        }
    }
}
```

```
Procedure CollectGarbage
{
acquire gc_latch
    /* P_0 */
    RRT = {}
    for each oid in WRT but not in TRT
        RedTraverse(oid)
            /* also caches the reference counts
                of visited objects in S Ref C_oid and W Ref C_oid */
    /* P_1 */
    TLIST = list of all transactions active at P_1
    Wait for all transactions in TLIST to end
    /* P_2 : instant when all transactions in TLIST end
    for each oid in RRT that is red but not in TRT
        /* S Ref C_oid and W Ref C_oid refer to
            cached reference counts*/
L_0 :   if S Ref C_oid + W Ref C_oid >
                S RedRef C_oid + W RedRef C_oid {
            if S Ref C_oid == 0/* oid is in WRT */
                remove oid from WRT
            get log_analyzer_latch
            invert the strength of all references to oid
            update reference counts of oid
            release log_analyzer_latch
            GreenTraverse(oid)
        }
    }
    /* P_3 */
L_1: for each oid in RRT that is red and is in TRT
        GreenTraverse(oid)
        /* P_4 : instant when the condition in L_1 evaluates to false */
        for each oid in RRT that is red
            Collect(oid)
        /* P_5 */
        release gc_latch
        remove all flagged entries from TRT
}
```

GARBAGE COLLECTION IN OBJECT ORIENTED DATABASES USING TRANSACTIONAL CYCLIC REFERENCE COUNTING

TECHNICAL FIELD

This invention relates to data processing systems and, more particularly, to memory reclamation in object oriented databases.

BACKGROUND OF THE INVENTION

There are al least two known approaches to memory reclamation, i.e., "garbage collection", in data processing systems employing object oriented databases, namely, copying collector based, and mark and sweep based processes. The copying collector process traverses an entire object graph used in the system and copies so-called "live" objects into a new memory space and, then, the entire "old" memory space is reclaimed. In contrast the mark and sweep process marks all live objects by traversing the entire object graph and, then, traverses, i.e., sweeps, the entire database and deletes all objects that are not marked. With both of the above noted processes, the cost of traversing the entire object graph can be prohibitively expensive for databases larger than the memory size, particularly if there are many cross-page references.

One attempt at overcoming problems and limitations of prior known garbage collection processes is the use of a so-called "reference counting" process. Reference counting is based on the concept of keeping a count of the number of pointers pointing to an object. When the reference count of an object is zero, the object is defined as being garbage and eligible for collection. One such reference counting process is described in an article entitled "Garbage Collection in Object Oriented Databases Using Transactional Cyclic Reference Counting", *Proceedings of the International Conference on Very Large Databases,* Athens, Greece, August 1997, pages 366–375.

This prior reference counting process, however, relies on the assumptions that strict two phase locking (2PL) and strict write ahead logging (WAL) are employed, and that every strong pointer is followed to an object. Use of such assumptions caused significant inefficiencies in this prior known reference counting process.

SUMMARY OF THE INVENTION

Problems and limitations with prior known reference counting garbage collection processes are addressed in a reference counting process in which only the "last" detected strong pointer is followed to an object.

Moreover, no assumptions are made about the phase locking used in the transaction and strict WAL is not followed. Indeed, a relatively restricted local traversal of the object graph is employed which leads to higher efficiency.

Furthermore, in a client-server arrangement, updates made by a transaction running at the client may be reflected at the server after the transaction ends, and the updates are not required to be forced to the server before the end of the transaction.

DETAILED DESCRIPTION

Cyclic Reference Counting Process

The basic idea behind the prior known Cyclic Reference Counting process is to label edges in the object graph as strong or weak. The labeling is done such that a cycle in the object graph cannot consist of strong edges alone; it must have at least one weak edge. Two separate reference counts for strong and for weak edges, denoted S Ref C and W Ref C, respectively, are maintained per object. It is not possible in general to cheaply determine whether labeling a new edge as strong creates a cycle of strong edges or not. Hence, in the absence of further information, the process takes the conservative view that labeling a new edge strong could create a cycle of strong edges, and labels the new edge weak.

The S Ref C and W Ref C are updated as edges are created and deleted. If for an object S, the S Ref C as well as W Ref C is zero, then S is garbage, and S and the edges from it are deleted. If the S Ref C is zero, but W Ref C is non-zero, there is a chance that S is involved in a self referential cycle of garbage. If the S Ref C of an object S is greater than zero, then S is guaranteed to be reachable from the root, however, the TCRC process does not guarantee this last property.

If the object graph did not have any garbage before the deletion of an edge to S, then the only potential candidates for becoming garbage are S and objects reachable from S. If S Ref C of S is zero and W Ref C of S is nonzero, a localized mark and sweep process detects whether S and any of the objects reachable from S are indeed garbage. The localized mark and sweep process performs a traversal from S and identifies all objects reachable from S and colors them red. Denote the above set by R. It then colors green every object in R that has a reference-from an object outside R, detected using reference counts. It also colors green all objects reachable from any green object. During this green marking phase some pointer strengths are updated to ensure that every object has at least one strong pointer to it. This pointer strength update is described in detail in the context of the transactional cyclic reference counting process. At the end, all objects in R not marked green are garbage and are deleted.

However, prior cyclic reference counting arrangements and processes, were designed for a single user system. They cannot be used in a multi-user environment with concurrent updates to objects, and do not deal with persistent data and failures. The invention lies in extending the prior cyclic counting process to (a) use logs of updates to detect changes to object references, (b) to work in an enviromnent with concurrent updates, (c) to work on persistent data in the presence of system failures and transaction aborts, (d) handle a batch of updates at a time rather than one update at a time, and (e) optimize the localized mark and sweep significantly by following only strong pointers.

System Model and Assumptions

In the inventive model, transactions log undo and redo information for all updates. Undo and redo records are represented as undo (tid, oid, offset, old-value), and redo (tid, oid, offset, new-value), where "tid" denotes a transaction identifier and "oid" denotes an object identifier. Object creation is logged as object-allocation (tid, oid). The commit log is represented as commit (tid), and the abort log is represented as abort (tid). It is required that from the oid, the type of the object can be identified, perhaps by first fetching the object, and from the offset it can be determined if the value that has been updated is a pointer field. These requirements are satisfied by most database systems.

As with any other garbage collection scheme, it is assumed that an object identifier (oid) is valid only if it either refers to a persistent root, or is present in a pointer field of an object in the database, or is in the transient memory, program variables or registers, of an active transaction that read the oid from an object in the database or created the object it refers to. Note that this precludes transactions from passing oids to other transactions, and from storing oids in external persistent storage.

One assumption is that the transactions follow WAL, that is, they log the undo value before actually performing the update, but the redo value may be logged anytime, before or after the update. Heretofore, it was assumed that transactions followed strict WAL; that is, that both the undo and redo values must be logged before actually performing the update.

Another assumption is that all logs for a transaction are forced to disk before commit or abort, force-logs-at-abort in addition to force-logs-at-commit.

The assumptions above are satisfied by typical storage managers for object-oriented databases.

It is further noted that there is no longer any assumption that transactions follow strict 2PL. Indeed, in this embodiment of the invention there are no assumptions regarding the locking policies used by transactions.

Transactional Cyclic Reference Counting (TCRC)

Associated with each object, the TCRC process maintains a strong reference count (S Ref C) giving the number of strong pointers pointing to the object, a weak reference count (W Ref C) giving the number of weak pointers pointing to the object, and a strength bit for the object. Each pointer also has a strength bit. The pointer is strong if the strength bit in the pointer and the strength bit in the object pointed to have the same value; otherwise the pointer is weak. This representation of strength using two bits is an important implementation trick. It makes very efficient the operation of flipping the strength of all pointers to an object. That is, making all strong pointers to the object weak, and all weak pointers to the object strong. All that need be done is to flip the value of the strength bit in the object.

The TCRC process also maintains another table, the Weak Reference Table (WRT), which contains oids for the objects which have a zero S Ref C, i.e., no strong pointers incident on them. The persistent root is never put into the WRT.

All the above information can be constructed from the object graph after a system crash by scanning the entire database. Therefore, it is not necessary to make it persistent and incur the overhead of logging updates to these structures. Reconstructing this information at crash will, however, affect the availability of the database. If fast recovery is required then these structures could be made persistent at the cost of extra logging. The choice of whether or not to make this information persistent can be left to each installation.

If the above structures are made persistent, then updates to S Ref C and W Ref C, update of the strength bit of an object or of a pointer, and the insert or delete of entries from the WRT are logged as part of the transaction whose pointer update caused the information to be updated/inserted/deleted. Thus, their updates will be undone if the transaction does not complete, and will be redone, while repeating history, if the system crashes.

Apart from the above structures, the following non-persistent structures are available; this means that irrespective of whether the above structures are made persistent these structures need not be persistent.

There is a non-persistent table that is used during garbage collection: the Red Reference Table (RRT); this table associates with some objects a strong red reference count (S RedRef C), a weak red reference count (W RedRef C), and a bit that indicates whether the color of the object is red or green. This table is stored on disk since the size of this table could be large in the worst case, but updates to this table are not logged.

TCRC maintains a non-persistent in-memory table called the Temporary Reference Table (TRT), which contains all those oids such that a reference to the object was added or deleted by an active transaction, or the object was created by the transaction. An oid in TRT is tagged with the tid of the transaction that is responsible for its insertion into TRT. There may be multiple entries in TRT for the same oid. An object whose oid is in TRT may not be garbage even if it is unreachable from any other object, since the transaction may store a reference to the object back in the database. Updates to TRT are also not logged.

Definition of Garbage Object

An object is defined to be garbage if it is not reachable from the persistent root or from any object in the TRT or from any object whose reference (oid) has been read by any active transaction.

Preferred Embodiment

Figure 1:
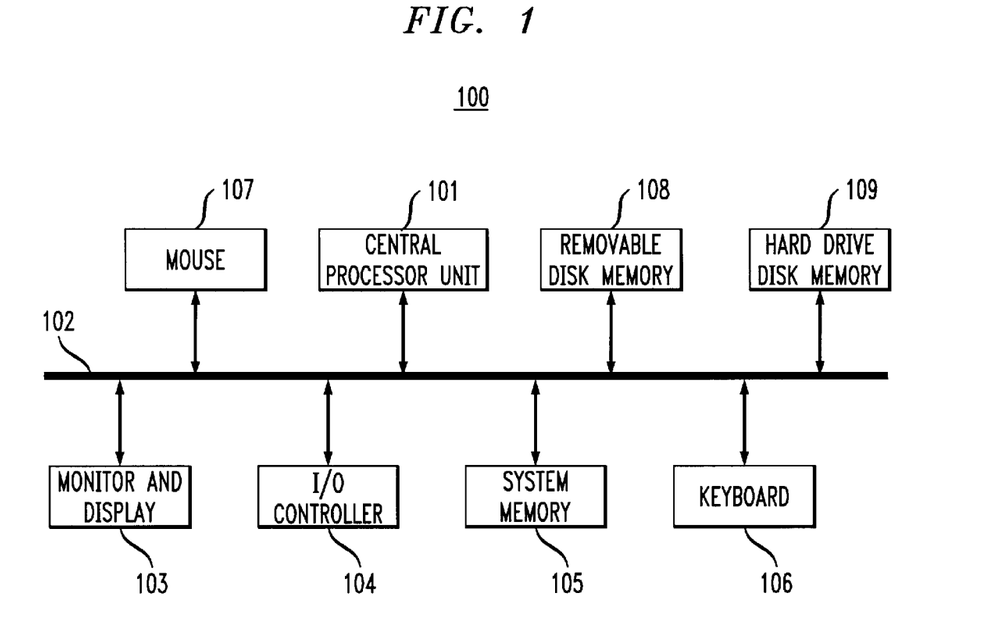
FIG. 1 shows, in simplified block diagram form, details of apparatus including an embodiment of the invention.

FIG. 1 shows, in simplified block diagram form, details of apparatus including an embodiment of the invention. Thus, shown is computer system 100 including central processor unit 101 interconnected via bus 102 with monitor and display 103, I/O controller 104, system memory 105, keyboard 106, mouse 107, removable disk memory drive 108, and hard disk memory drive 109. Indeed, FIG. 1 illustrates but one arrangement for implementing an embodiment of the invention and other similar arrangements may be employed to equally practice one or more embodiments of the invention. Note that one or more databases may be stored in system memory 105.

Figure 2:
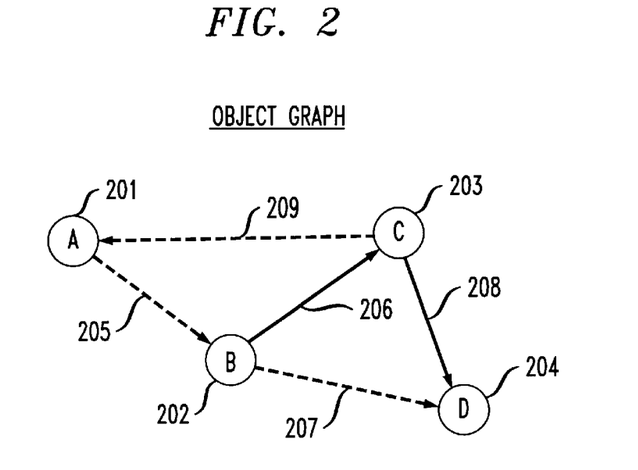
FIG. 2 illustrates an object graph useful in describing an embodiment of the invention.

FIG. 2 illustrates an object graph useful in describing an embodiment of the invention. Specifically, shown are objects A 201, B 202, C 203 and D 203. Note that weak edges between the objects are denoted in dashed outline and strong edges are denoted by solid outline. Thus, the pointer 205 between object A and object B is a weak edge, the pointer 206 between object B and Object C is a strong edge, the pointer 207 between object B and object D is a weak edge, the pointer 208 between object C and object D is a strong edge and the pointer 209 between object C and object A is a weak edge.

TCRC Process

TCRC includes two distinct processes. The first is the log analyzer process (LogAnalyzer). The second process is the actual garbage collection process (CollectGarbage). The execution of these processes is synchronized by two latches: a log_analyzer_latch that is taken for the duration of LogAnalyzer, and a gc_latch that is taken for the duration of CollectGarbage. The two processes are described below in conjunction with the preferred embodiment.

Log Analyzer

The log analyzer process analyzes log records generated by the transaction, and performs various actions based on the log records. We shall assume it is run as part of the transaction itself, and is invoked each time a log record is appended to the system log tail, and is atomic with respect to the appending of the log record.

In the actual implementation, it is possible to run the log analyzer as a separate thread, and when a transaction appends a log record to the system log, it actually only delivers it to the log analyzer, which then appends the log record to the system log.

The log analyzer makes use of the following procedures. Procedure DeletePointer decrements the W Ref C or S Ref C for an object when a pointer to the object is deleted. If the S Ref C falls to zero after the decrement, then the object's oid is put into WRT. Procedure AddPointer, by default, sets the strength of the pointer to be weak and increments the W Ref C of the object pointed to. The strength is set to weak so that cycles of strong edges are not created; however, as indicated below it is possible to make some new pointers strong.

The procedure LogAnalyzer functions as follows. First it obtains the log-analyzer-latch, which is also acquired by the garbage collection thread, to establish a consistent point in the log. The latch is obtained for the duration of the procedure. The log is analyzed by the log analyzer and depending on the type of the log record various actions as outlined below are taken.

For undo/redo log records caused by pointer updates, the reference counts for the affected objects are updated. This is done by DeletePointer in case of undo logs, and AddPointer in case of redo logs. The oid of the affected object is inserted into the TRT tagged with the tid of the transaction that made the update.

For log records corresponding to the creation of objects, the reference counts for the new object are initialized to zero, and the oid of the created object is inserted into the WRT. The oid of the created object is inserted into the TRT tagged with the tid of the transaction that created the object.

For end-of-transaction commit or abort log records, the process first tries to get the gc_latch. If the latch is obtained immediately, then garbage collection is not in progress and remove all the oid entries for the terminating transaction from the TRT and the gc_latch released thereafter, recall that each oid entry in TRT is tagged with the tid of the transaction that is responsible for its presence in TRT. However, if the gc_latch cannot be obtained immediately then a garbage collection is in progress concurrently. In this case, the oid entries for the terminating transaction are not removed, but instead flagged for later removal by the garbage collector.

All operations on pointer strengths and reference counts are protected by a latch on the object pointed to, although not explicitly mentioned in our processes. Access to WRT and TRT are also protected by latches.

The following properties follow from the above discussion.

The persistent root is never placed in the WRT. It has no references to it. Therefore it never occurs in the TRT or RRT.

The objects in TRT corresponding to a transaction are removed only when (a) the transaction has ended and (b) garbage collection is not in progress.

Figure 3:
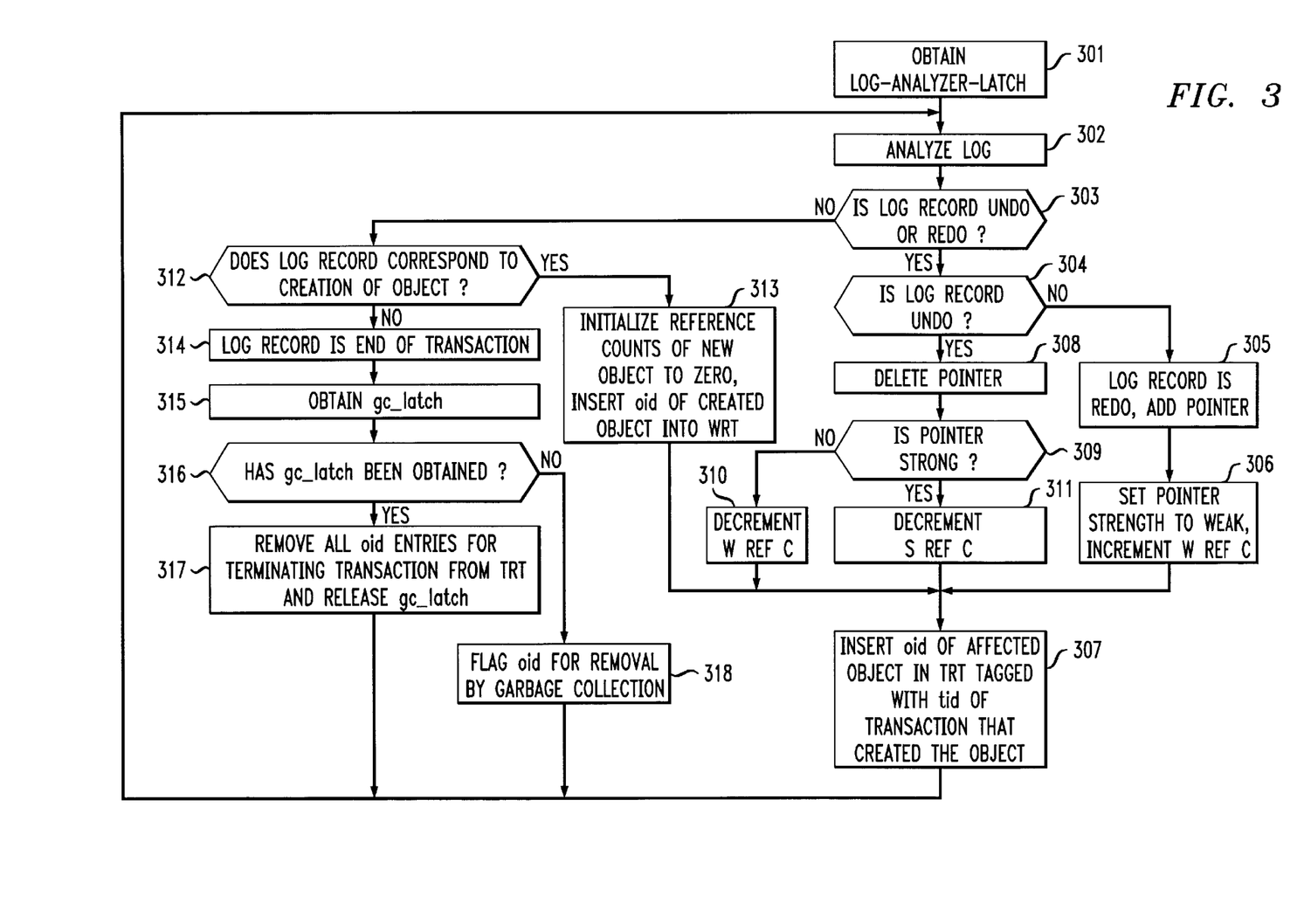
FIG. 3 is a flow chart illustrating the steps of the log analyzer process.

FIG. 3 is a flow chart illustrating the steps of the above log analyzer process. Thus, in step 301 the log-analyzer-latch is obtained. Then, step 302 analyzes the log, and step 303 tests to determine if the log record is undo or redo. If the test result is YES, step 304 tests to determine if the log record is undo. If the test result is NO, step 305 indicates that the log record is redo and a pointer is added. Then, step 306 causes the added pointer strength to be weak and W REF C is incremented. Thereafter, control is transferred to step 307, which causes the oid of the affected object to be inserted TRT with tid of the transaction that created the object. Then, control is returned to step 302 and the process is repeated. Returning to step 304, if the test result is YES the log record is undo and step 308 causes a pointer to be deleted. To this end, step 309 tests to determine if the pointer is strong. If the test result is NO, the pointer is weak, and step 310 causes W REF C to be decremented. Thereafter, control is transferred to step 307, which is effected as described above. Then, control is again transferred to step 302 and the process is repeated. Returning to step 309, if the test result is YES, the pointer is strong, and step 311 causes S REF C to be decremented. Thereafter, control is transferred to step 307, which is effected as described above. Then, control is again transferred to step 302 and the process is repeated. Returning to step 303, if the test result is NO, the log record is neither undo nor redo, and step 312 tests to determine if the log record corresponds to the creation of an object. If the test result is YES, step 313 causes the initialization of the reference counts of the new object to zero, and the insertion of the oid of the created object in WRT. Thereafter, control is transferred to step 307, which is effected as described above. Then, control is again transferred to step 302 and the process is repeated. Returning to step 312, if the test result is NO, and step 314 indicates that the log record is an end of transaction. Then, step 315 causes the gc_latch to be obtained. Step 316 tests to determine if the gc_latch has been obtained. If the test result is YES, step 317 causes removal of all oid entries for the terminating transaction from TRT and the release of gc_latch. Then, control is returned to step 302 and the process is repeated. Returning to step 316, if the test result is NO, the gc_latch has not been obtained, and step 318 causes the oid entries for the terminating transaction are flagged for removal by the garbage collection process, described below.

Garbage Collection

Figure 4:
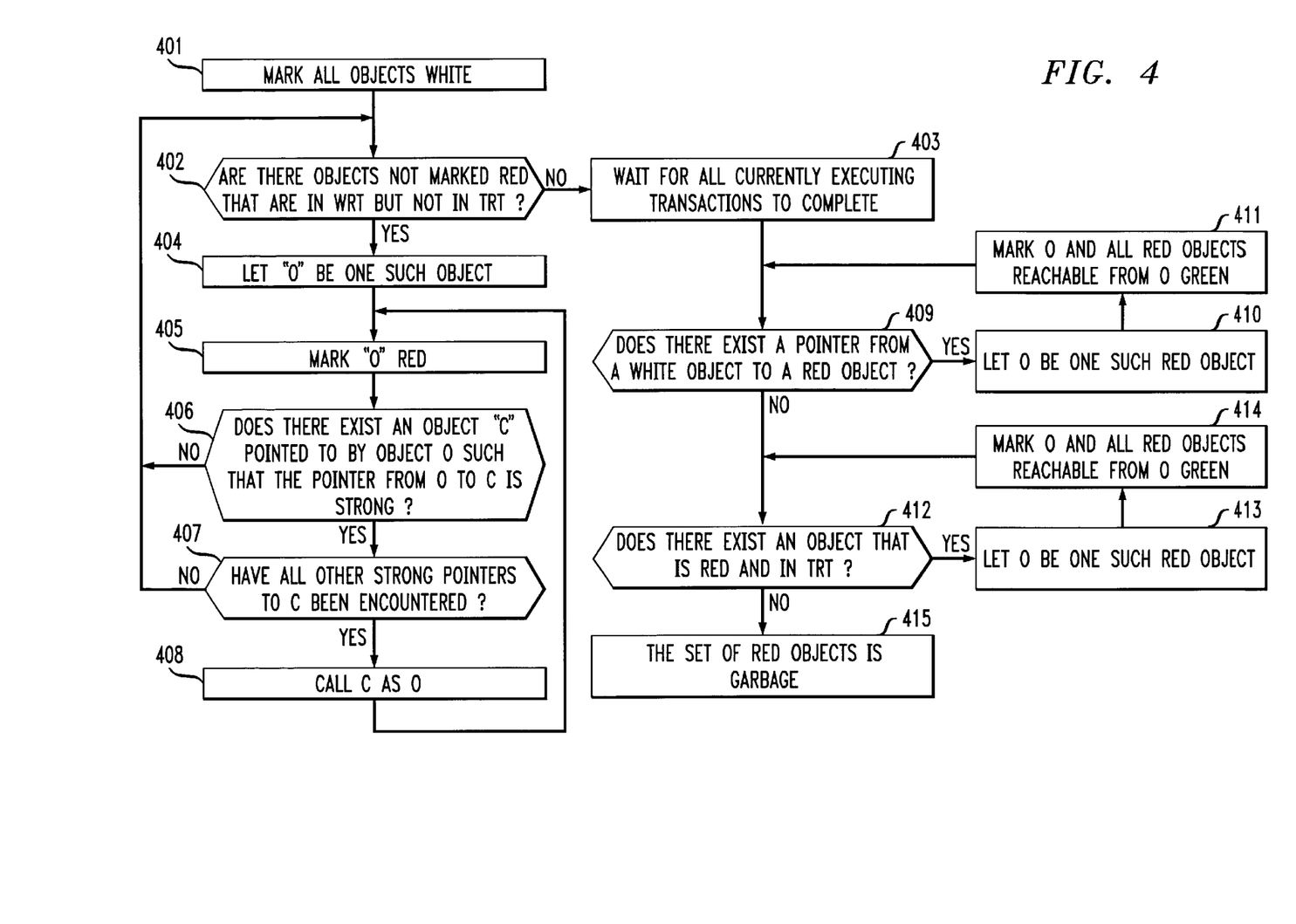
FIG. 4 shows in simplified form a flowchart illustrating steps in one embodiment of a memory reclamation, i.e., garbage collection, process including an embodiment of the invention.

FIG. 4 shows in simplified form a flowchart illustrating steps in one embodiment of a memory reclamation, i.e., garbage collection, process including an embodiment of the invention. The garbage collection process is activated periodically, possibly depending on availability of free memory space. The process makes use of the support functions RedTraverse, GreenTraverse and CollectGarbage described below.

Specifically, the memory reclamation, i.e., garbage collection, process starts in step 401 by marking all objects white in an object graph, e.g., as shown in FIG. 2. Then, step 402 tests to determine if there are objects marked red that are in WRT, i.e., a first prescribed reference table, but not in TRT, i.e., a second prescribed reference table. If the test result is NO, control is transferred to step 403. If the test in step 402 is YES, step 404 allows "O" be one such red object. In step 405 the object marked O is marked red. Thereafter, step 406 tests to determine if there does exist an object "C" pointed to by an object O such that the pointer from O to C is strong. If the test result in step 406 is NO, control is returned to step 402 and appropriate ones of steps 402 through 406 are iterated until step 406 yields a YES result or, alternatively, if step 402 yields a NO result and, then, appropriate ones of steps 403 through 415 are effected, as explained below. If the test result in step 406 is YES, control is transferred to step 407. Step 407 tests to determine if all strong pointers to object C have been encountered. If the test result in step 407 is NO, control is returned to step 402 and appropriate ones of steps 402 through 407 are iterated until step 406 yields a YES result or, alternatively, if step 402 yields a NO result, appropriate ones of steps 403 through 415 are effected, as explained below. If the test result in step 407 is YES, control is transferred to step 407 which causes to call object C as object O. Thereafter, control is returned to step 405 and appropriate ones of steps 404 through 408 are iterated until step 402 yields a NO result. Note that the iteration of step 402 yielding a YES result and steps 404 through 408 until step 402 yields a NO result, causes a first set of red objects, i.e., objects of a first type, to be accumulated. Then, step 403 causes a wait interval until all currently executing transactions are completed. Step 409 tests to determine if there does exist a pointer from a white object to a red object. If the test result is YES, step 410 causes object O to be one such red object. Then, step 411 marks object O and all red objects reachable from O green and control is returned to step 409. Steps 409 through 411 are iterated until step 409 yields a NO result. This effectively removes red objects from the first set that are pointed to by other than red objects. Then, step 412 tests to determine if there does exist an object that is red and is in TRT. If the test result is YES, step 413 causes object O to be one such red object. Then, step 414 marks object O and all red objects reachable from O green and control is returned to step 412. Steps 412 through 414 are iterated until step 412 yields a NO result. This effectively causes the removal of red objects from the first set that are in TRT. Thereupon, step 415 indicates that the resulting second set of red objects is garbage.

RedTraverse

Figure 5:
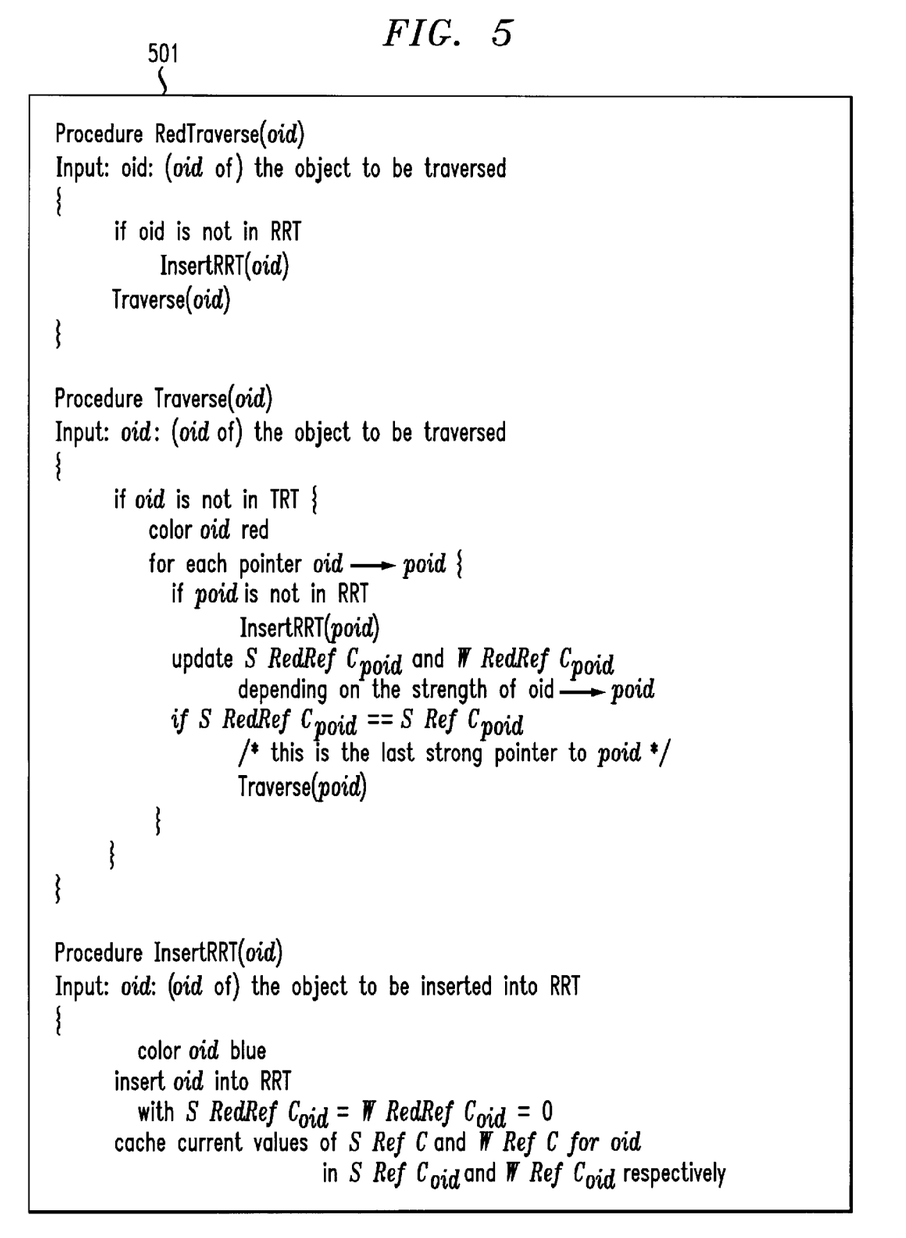
FIG. 5 shows in pseudo code form details of a red traverse procedure and a procedure insert RRT used therein employed in the garbage collect procedure employed in an embodiment of the invention.

FIG. 5 shows in pseudo code form details of a red traverse procedure, and a procedure insert RRT used therein, employed in the garbage collect procedure utilized in an embodiment of the invention;

Procedure RedTraverse populates the RRT, i.e., a third reference table, with objects it identifies as potential garbage. The rest of the garbage collection process is restricted to only the objects in RRT. The pseudo code 501 for RedTraverse as shown in FIG. 5 is as follows:

```
Procedure RedTraverse(oid)
Input: oid: (oid of) the object to be traversed
{
    if oid is not in RRT
        InsertRRT(oid)
        Traverse(oid)
}
Procedure Traverse(oid)
Input: oid: (oid of) the object to be traversed
{
    if oid is not in TRT {
        color oid red
        for each pointer oid → poid {
            if poid is not in RRT
                InsertRRT(poid)
            update S RedRef $C_{poid}$ and W RedRef $C_{poid}$
                depending on the strength of oid → poid
            if S RedRef $C_{poid}$ == S Ref $C_{poid}$
                /* this is the last strong pointer to poid*/
```

-continued

```
            Traverse(poid)
        }
    }
}
Procedure InsertRRT(oid)
Input: oid: (oid of) the object to be inserted into RRT
{
    color oid blue
    insert oid into RRT
        with S RedRef $C_{oid}$ = W RedRef $C_{oid}$ = 0
    cache current values of S Ref C and W Ref C for oid
        in S Ref $C_{oid}$ and W Ref $C_{oid}$ respectively
}
```

RedTraverse performs a fuzzy localized traversal of the object graph. It is invoked on all objects in WRT that are not in TRT. Thereafer, an object is visited by any of the invocations if and only if the object is not in TRT and all the objects that have a strong pointer to this object have been visited earlier. No locks are obtained on the objects being traversed. Short term latches may be obtained on objects or pages to ensure physical consistency. Thus, as seen in the RedTraverse pseudo code 501, only the last strong pointer is followed to an object, in accordance with the invention. RedTraverse marks all visited objects red and puts them in RRT.

Additionally, RedTraverse caches the reference counts (S Ref C and W Ref C) of each object in RRT at the instant it visits the object. RedTraverse also maintains for each object in RRT, two counts: S RedRef C and W RedRef C, giving the number of strong and weak pointers, respectively, to the object from all other objects visited. These counts are maintained on the fly during the traversal; in order to do so, RedTraverse also maintains these counts for objects that are reachable by a single weak edge from objects in RRT, since such objects may be added to RRT later in the traversal. In the RedTraverse pseudo code 501, these objects are colored blue. Hereinafter, the presence of blue objects in RRT is ignored, and it is assumed that they are explicitly removed from RRT after the last invocation of RedTraverse. The invocations of RedTraverse are collectively termed red traversal.

GreenTraverse

Figure 6:
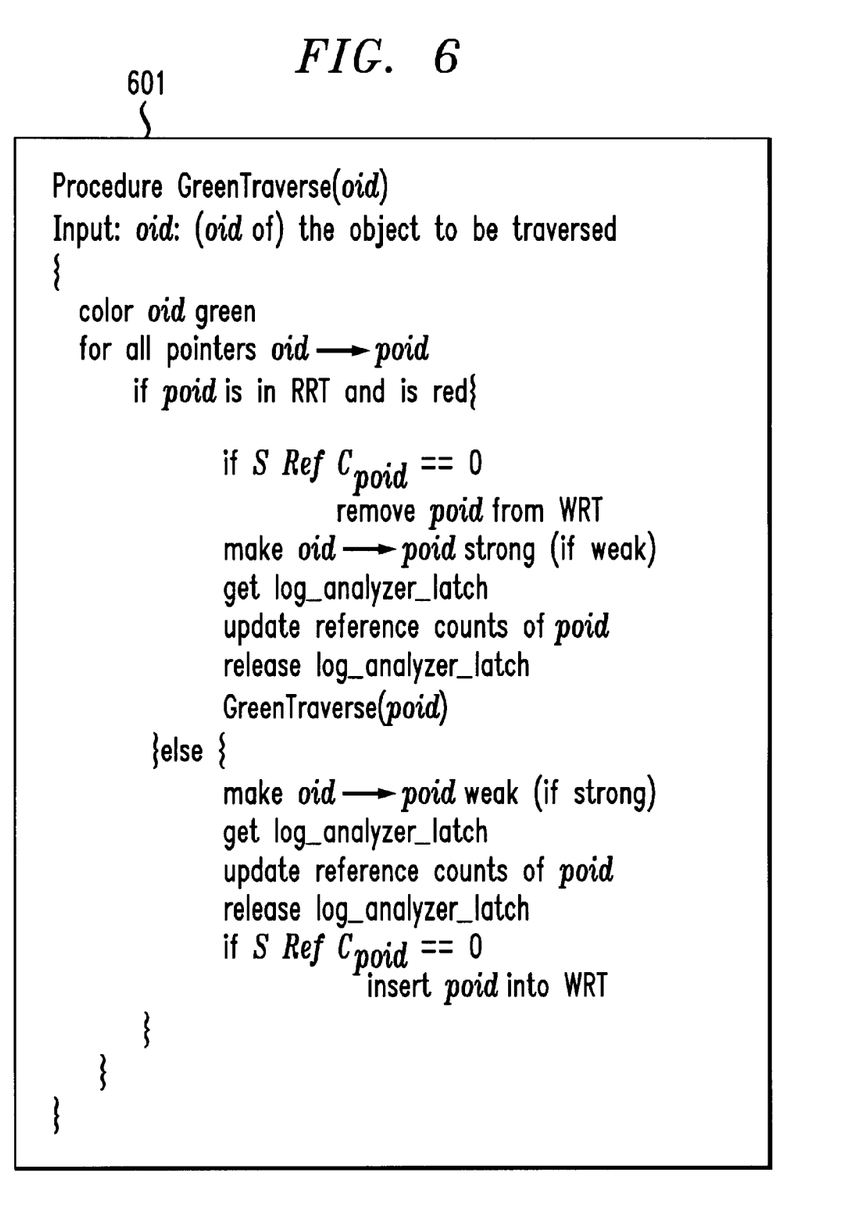
FIG. 6 shows in pseudo code form details of a green traverse procedure employed in the garbage collect procedure employed in an embodiment of the invention.

FIG. 6 shows in pseudo code form details of a green traverse procedure employed in the garbage collect procedure employed in an embodiment of the invention.

Procedure GreenTraverse performs a fuzzy traversal with the purpose of marking live objects in RRT green and updating some pointer strengths to ensure that every object it visits has at least one strong pointer referring to the object, this ensures that in the absence of update transactions during he garbage collection phase, no object will be in WRT. Thus, ensuring that there is no work to be done during the next garbage collection phase. Additionally, the pointer strength updates have to be done in such a fashion that strong cycles do not remain at the end of the garbage collection phase. The pseudo code 601 for GreenTraverse as shown in FIG. 6 is as follows:

```
Procedure GreenTraverse(oid)
Input: oid: (oid of) the object to be traversed
{
    color oid green
    for all pointers oid → poid
        if poid is in RRT and is red{
```

```
            if S Ref C_poid == 0
                remove poid from WRT
            make oid → poid strong (if weak)
            get log_analyzer_latch
            update reference counts of poid
            release log_analyzer_latch
            GreenTraverse(poid)
        }else {
            make oid → poid weak (if strong)
            get log_analyzer_latch
            update reference counts of poid
            release log_analyzer_latch
            if S Ref C_poid == 0
                insert poid into WRT
        }
    }
}
```

Starting from the object Procedure GreenTraverse is invoked on, it visits all the red objects in RRT that are reachable from this object in a depth first manner: it back tracks from an object after it has visited all red objects in RRT reachable from that object. In addition, it makes the references from the object to as yet unvisited (red) objects strong and the references to already visited (green) objects and to objects not in RRT weak. Actually, not all references made weak by GreenTraverse need be made weak. The invocations of GreenTraverse are collectively termed green traversal.

CollectGarbage

Procedure CollectGarbage actually deletes an object; before doing so, it deletes all pointers out of the object, updating the stored reference counts (S Ref C and W Ref C) of the objects pointed to. It also removes the object from WRT.

Figure 7:
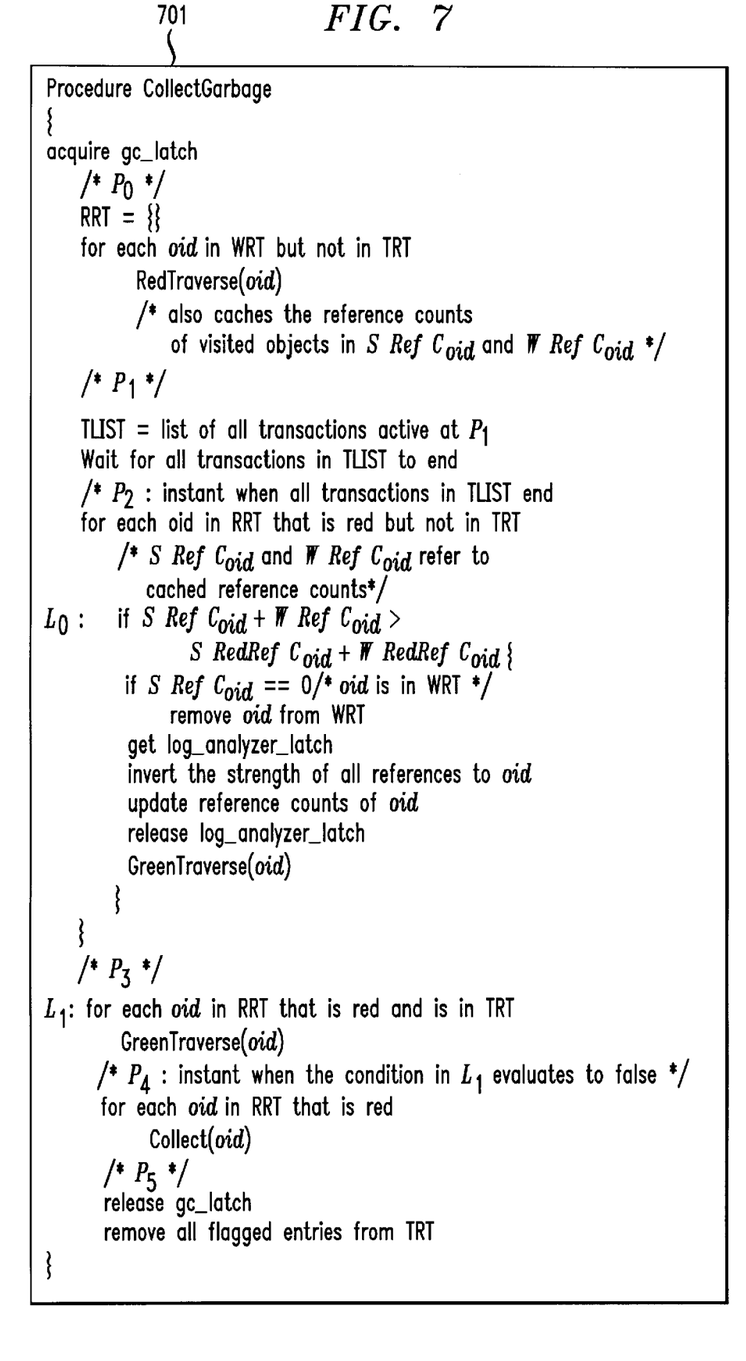
FIG. 7 shows in pseudo code form details of a garbage collection procedure employed in the garbage collect procedure employed in an embodiment of the invention.

FIG. 7 shows in pseudo code form details of a garbage collection procedure employed in the garbage collect procedure employed in an embodiment of the invention.

The garbage collection process is implemented by Procedure CollectGarbage, and its pseudo code 701 as shown in FIG. 7 is as follows:

```
Procedure CollectGarbage
{
acquire gc_latch
    /* P_0 */
    RRT = { }
    for each oid in WRT but not in TRT
        RedTraverse(oid)
        /* also caches the reference counts
           of visited objects in S Ref C_oid and W Ref C_oid */
        /* P_1 */
        TLIST = list of all transactions active at P_1
        Wait for all transactions in TLIST to end
        /* P_2: instant when all transactions in TLIST end
        for each oid in RRT that is red but not in TRT
            /* S Ref C_oid and W Ref C_oid 1 refer to
                cached reference counts*/
        L_0:    if S Ref C_oid + W Ref C_oid >
                   S RedRef C_oid + W RedRef C_oid {
                if S Ref C_oid == 0 /* oid is in WRT */
                   remove oid from WRT
                get log_analyzer_latch
                invert the strength of all references to oid
                update reference counts of oid
                release log_analyzer_latch
                GreenTraverse(oid)
            }
        }
        /* P_3 */
    L_1: for each oid in RRT that is red and is in TRT
            GreenTraverse(oid)
        /* P_4: instant when the condition in L_1 evaluates to false */
        for each oid in RRT that is red
            Collect(oid)
        /* P_5 */
        release gc_latch
        remove all flagged entries from TRT
}
```

The first step in the CollectGarbage process is to acquire gc_latch. At some point $P_0$ after this, RedTraverse is invoked on all objects that are in WRT but not in TRT. After the red traversal, we wait for all transactions that were active at some point $P_1$ after the end of the red traversal to terminate.

This wait is necessary for correctness of the process in face of transactions following non-strict WAL and arbitrary locking protocols.

In case a transaction T does not follow strict-2PL locking, the following scenario can occur. T takes a lock on some object x, reads the reference to y from some pointer field in x, and then releases the lock on x. Next, all the references to y get deleted and all the transactions that made the deletions commit, this can happen because T has released the lock on x. This makes y unreachable from any live object; but y is not garbage because oid of y is cached by T that can insert a pointer to y from some other object later. The wait ensures that all transactions such as T end before analysis proceeds.

The wait further ensures, in face of non-strict WAL, that all the redo logs for pointer inserts that occurred during the red traversal are forced to disk in addition to the undo logs for pointer deletions before analysis proceeds; this is because all the logs for a transaction are, by assumption, necessarily forced before the end of the transaction. This makes the TRT consistent with respect to any insertion or deletion of pointers that might have occurred during the red traversal. The list of transactions TLIST can be determined fuzzily, that is, we need not take a latch on the transaction table while scanning it. This is safe because only the following may happen while the scan is in progress: (a) some transaction that was active at $P_1$ ends and does not appear in TLIST; this is acceptable because we were just going to wait for it to end anyway; or (b) some transaction starts after $P_1$ and its entry appears in TLIST; this is acceptable because this can only extend the wait. $P_2$ is the instant when all the transactions in TLIST terminate.

Next, green traversal is performed to mark green all the live objects in RRT. After $P_2$, GreenTraverse is invoked on an object in RRT that is red but not in TRT if the total red reference counts (S RedRef C+W RedRef C) for the object computed during the red traversal is strictly less than its total reference counts (S Ref C+W Ref C) that are cached during the red traversal, as checked in statement $L_0$. These objects are live: they are referred from some object not in RRT. But before the invocation, the strengths of all references to this object are inverted and the reference counts updated atomically with respect to the log analyzer, log-analyzer-latch is used for this purpose. The inversion of strengths is necessary to ensure that after this garbage collection phase is over, there will be at least one strong pointer to the object, notice that all references to the object from objects not in RRT must be weak. This is necessary to ensure that in absence of update transactions no work will be done by the next garbage collection phase. This inversion of strengths might cause strong cycles to be formed. But these will not exist after this garbage collection phase is over.

After the above invocations complete at $P_3$, GreenTraverse is invoked on objects in RRT that are red and in TRT since their references may still be stored in an ongoing transaction and can potentially be stored back in the database. These invocations get over at the instant $P_4$ when the condition in step $L_1$ evaluates to false; that is, at $P_4$ no red object in RRT is in TRT.

In the pseudo code 701, it is left unspecified how (at step $L_1$) the consistent point $P_4$ is obtained. It turns out that the following simple procedure is enough. Repeated scans of the RRT are made, invoking GreenTraverse on red objects that have been inserted into TRT since they were checked in the previous scan; and terminating when no such object is detected in the latest scan. The consistent point $P_4$ corresponds to the instant the last scan starts. This is because if some object in RRT is red and is in TRT at the start of the last scan, then during the scan it stays red because of the fact that GreenTraverse is not invoked in the interim; and stays in TRT because garbage collection is not in progress. But then, it must be detected to be red and in TRT during the last scan; a contradiction.

All objects in RRT that are red at $P_4$ are collected next. The collection is over at $P_5$. Finally, the gc_latch is released and all the entries in TRT that were tagged as removable by transactions that completed since the garbage collection phase began (that is, since gc_latch was acquired) are removed.

Support for Local Undo by the Recovery Manager

The TCRC process needs some support from the recovery manager in the form of supporting logical undos to ensure correctness. This support is required only if we choose to maintain the reference counts, pointer strengths and WRT persistent. There are some actions whose undos have to be performed logically and not physically.

Pointer Deletion and Strength Update: Undo of a pointer deletion or strength update, if performed naively, may introduce strong cycles in the graph, which can affect the correctness of the process. The right way to undo a pointer deletion is to reinsert the pointer with the strength set to be weak, even if it was strong earlier. Similarly, the undo of a pointer strength update (done in case of system crash during the garbage collection phase) is to set the strength of the pointer as weak, irrespective of the original strength.

Reference Counts Update: The reference counts of an object O can be concurrently updated by multiple transactions, including the garbage collector, through different objects that are locked by the transactions. The object O itself need not be locked since only a reference to it is being updated. Only short term latches are necessary for maintaining physical consistency. If a transaction that updated the reference count of an object aborts, it should be logically undone; the undo of a reference count increment is a decrement of the same reference count, while the undo of a reference count decrement is always an increment of W Ref C since a reinserted pointer is always weak.

Client-Server

Figure 8:
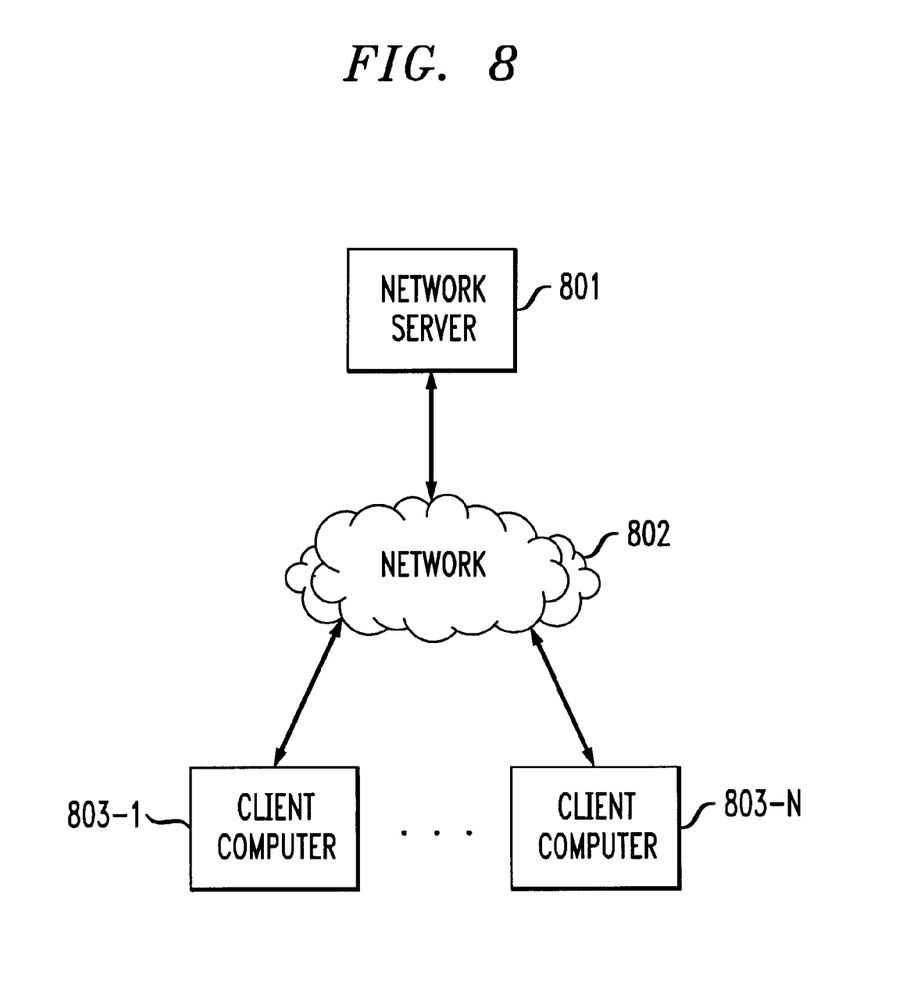
FIG. 8 shows, in simplified block diagram form, a server-client arrangement in which an embodiment of the invention may be advantageously employed.

FIG. 8 shows, in simplified block diagram form, a server-client arrangement in which an embodiment of the invention may be advantageously employed. Specifically, shown are server 801, which is interconnected via network 802, with one or more clients 803-1 through 803-N. Network 802 may be any known network for interconnecting server 801 with the client positions 803, which may be, for example, computers.

The following assumptions are required for the collect Garbage process to function properly in a data shipping client-server system of FIG. 8.

The transactions only run at the client positions 803. The server 801 can determine what transactions are possibly active at the client positions 803 at any given instant.

Cache consistency is guaranteed among the client positions 803. Thus, the transactions running at any client position 803 always see the latest state of the database.

All undo records are received at the server 801 before the update is reflected at the server 801 (WAL).

All logs for a transaction are received at the server 801 before a commit or an abort is effected, force-logs-at-abort in addition to force-logs-at-commit.

To guarantee that the collect garbage process, described above, functions properly in the client-server system of FIG. 8 with the above-noted assumptions, the process requires the following property: the objects in the TRT corresponding to a transaction are removed only when (a) the transaction is ended; (b) all updates by the transaction are reflected at the server; and garbage collection is not in progress at the server.

Note that in the client-server system, the LogAnalyzer and garbage collection processes are run at the server 801. Consequently, some care, must be taken during traversals of the object graph. This is because the database state at the server 801 is not current. Indeed, it might be that an object might have a reference to some newly created object that is not yet present at the server 801. Such a dangling reference is simply ignored during the traversals.

Furthermore, in the client-server embodiment of FIG. 8, the "force" requirement is also relaxed. That is, updates made by a transaction running at a client position 803 can be reflected at the server 801 after the transaction is completed, and are required to be forced to server 801 before the end of the transaction.

The above-described methods and apparatus are, of course, merely illustrative of the principles of the invention. Indeed, numerous other methods or apparatus may be devised by those skilled in the art without departing from the spirit and scope of the invention.

What is claimed is:

1. A method for use in a computer system to collect garbage in an object oriented database using transaction cyclic reference counting, the method comprising the steps of:

(a) determining if there are first objects not marked of a first type in a first prescribed reference table but not in a second prescribed reference table;

when the result of step (a) is YES;

(b) marking a first object as said first type;

(c) determining a prescribed object pointed to by said marked first object such that a pointer from said first object to said prescribed object is strong;

(d) determining all strong pointers to said prescribed object;

(e) determining the last of said strong pointers from said marked first object to said prescribed object;

(f) repeating steps (a) through (e) for all of said first objects to yield a first set of objects of said first type;

when the result in step (a) is NO;

(g) waiting for all currently executing transactions to be completed;

(h) determining and removing from said first set of objects of said first type, second objects of said first type that are pointed to from objects other than said first type;

(i) determining and removing from said first set of objects of said first type, third objects of said first type that are in a third prescribed reference table;

wherein a second set of objects of said first type resulting after removal of said second objects of said first type and said third objects of said first type from said first set of objects of said first type is defined as garbage.

2. The method as defined in claim 1 further including the step of deleting said second set of objects of said first type, whereby memory in a database is reclaimed.

3. The method as defined in claim 2 wherein said steps (b) through (f) are restricted to said first objects in said first prescribed reference table but not in said second prescribed reference table, and firther including inserting representations of said objects in said first set of objects of said first type in a third prescribed reference table.

4. The method as defined in claim 3 wherein said objects in said first set of objects of said first type are identified as potential garbage, and wherein steps (d) through (i) we restricted to objects identified by said representations in said third prescribed reference table.

5. The method as defined in claim 4 wherein said pointers pointing to objects in said third prescribed reference table have strengths, and further including the step of updating prescribed pointer strengths to ensure that every object visited in said third prescribed reference table has at least one strong pointer referring to it.

6. The method as defined in claim 5 wherein each of said objects has a strength bit associated with it and each of said pointers has a strength bit associated with it, and wherein a pointer is defined as being strong when the strength bit associated with said pointer is strong and the strength bit associated with an object that the pointer is pointing to is strong, otherwise the pointer is defined as being weak.

7. The method as defined in claim 6 wherein when step (a) yields a Yes result further including the steps of determining if a representation of an object to be traversed is in said third prescribed reference table and, if not, inserting a representation of said object to be traversed in said third prescribed reference table.

8. The method as defined in claim 7 wherein said third prescribed reference table includes first, second, third and fourth reference count stores and wherein when an object is inserted into said third prescribed reference table a count in each of said first and second reference count stores is set to zero and current values of fifth and sixth reference counts for said object being inserted into said third prescribed reference table are stored in said third and fourth reference count stores, respectively.

9. The method as defined in claim 8 wherein upon insertion of the representation of an object in said third prescribed reference table counts in said first and third reference count stores are updated, and if the strength of a pointer pointing to said object is strong and if the reference counts in said first and third reference count stores is equal, then, said pointer is the last strong pointer to said object.

10. The method as defined in claim 9 wherein if the object being pointed to is represented in sold third prescribed reference table and is of said first type, it is removed from said first set of objects of said first type and if a pointer pointing to it is weak it is made strong, and reference counts for said object being pointed to are updated.

11. The method as defined in claim 9 wherein if the object being pointed to is represented in said third prescribed reference table and is of said first type, it is removed from said first set of objects of said first type and if a pointer pointing to it is strong it is made weak, and reference counts for said object being pointed to are updated.

12. The method as defined in claim 2 further including the steps of analyzing log records generated by said transactions to determine if said objects associated with said tractions are garbage, obtaining a garbage collection latch and if obtained, removing representations of said objects determined to be garbage, and if said garbage collection latch is not obtained flagging said representations of said objects for removal.

13. The method as defined in claim 12 further including the steps of including said flagged representations in said second prescribed reference table, and of removing all flagged representations of objects in said second prescribed reference table.

14. A method of use in removing garbage in an object oriented database in a computer system including at least one server and one or more client positions associated with a server, the method comprising the steps of:

at said at least one server
(a) determining if there are first objects not marked of a first type in a first prescribed reference table but not in a second prescribed reference table;
when the result of step (a) is YES;
(b) marking a first object as said first type;
(c) determining a prescribed object pointed to by said marked first object such that a pointer from said first object to said prescribed object is strong;
(d) determining all strong pointers to said prescribed object;
(e) determining the last of said strong pointers from said marked first object to said prescribed object;
(f) repeating steps (a) through (e) for all of said first objects to yield a first set of objects of said first type;
when the result in step (a) is NO;
(g) waiting for all transactions currently being executed at one of said one or more client positions to be completed;
(h) determining and removing from said first set of objects of said first type, second objects of said first type that are pointed to from objects other than said first type;
(i) determining and removing from said first set of objects of said first type, third objects of said first type that are in a third prescribed reference table;
wherein a second set of objects of said first type resulting after removal of said second objects of said first type and said third objects of said first type from said first set of objects of said first type is defined as garbage.

15. The method as defined in claim 14 fiber including the step of deleting said second set of objects of said first type, whereby memory in a database is reclaimed.

16. The method as defined in claim 15 wherein said steps (b) through (f) are restricted to said first objects in said first prescribed reference table but not in said second prescribed reference table, and further including inserting representations of said objects in said first set of objects of said first type in a third prescribed reference table.

17. The method as defined in claim 16 wherein said objects in said first set of objects of said first type are identified as potential garbage, and wherein steps (g) through (i) are restricted to objects identified by said representations in said third prescribed reference table.

18. The method as defined in claim 17 wherein said pointers pointing to objects in said third prescribed reference table have strengths, and further including the step of updating prescribed pointer strengths to ensure that every object visited in said third prescribed reference table has at least one strong pointer referring to it.

19. The method as defined in claim 18 wherein each of said objects has a strength bit associated with it and each of said pointers has a strength bit associated with it, and wherein a pointer is defined as being strong when the strength bit associated with said pointer is strong and the strength bit associated with an object that the pointer is pointing to is strong, otherwise the pointer is defined as being weak.

20. The method as defined in claim 19 wherein when step (a) yields a Yes result further including the steps of determining if a representation of an object to be traversed is in said third prescribed reference table and, if not, inserting a representation of said object to be traversed in said third prescribed reference table.

21. The method as defined in claim 20 wherein said third prescribed reference table includes first, second, third and fourth reference count stores and wherein when an object is inserted into said third prescribed reference table a count in each of said first and second reference count stores is set to zero and current values of fifth and sixth reference counts for said object being inserted into said third prescribed reference table are stored in said third and fourth reference count stores, respectively.

22. The method as defined in claim 21 wherein upon insertion of the representation of an object in said third prescribed reference table counts in said first and third reference count stores are updated, and if the strength of a pointer pointing to said object is strong and if the reference counts in said first and third reference count stores is equal, then, said pointer is the last strong pointer to said object.

23. The method as defined in claim 22 wherein if the object being pointed to is represented in said third prescribed reference table and is of said first type, it is removed from said first set of objects of said first type and if a pointer pointing to it is weak it is made strong, and reference counts for said object being pointed to are updated.

24. The method as defined in claim 22 wherein if the object being pointed to is represented in said third prescribed reference table and is of said first type, it is removed from said first set of objects of said first type and if a pointer pointing to it is strong it is made weak, and reference counts for said object being pointed to are updated.

25. Apparatus for use in a computer system to collect garbage in an object oriented database using transaction cyclic reference counting, the apparatus comprising:

means for determining if there are first objects not marked of a first type in a first prescribed reference table but not in a second prescribed reference table;

means for marking said first objects as said first type;

means for determining prescribed objects pointed to by said marked first objects such that pointers from said marked first objects to said prescribed objects are strong;

means for determining all strong pointers to each of said prescribed objects;

means for determining the last of said strong pointers from said marked first objects to said prescribed objects;

whereby a first set is obtained of objects of said first type;

means for determining that all currently executing transactions have been completed;

means for determining and for removing from said first set of objects of said first type, second objects of said first type that are pointed to from objects other than said first type;

means for determining and for removing from said first set of objects of said first type, third objects of said first type tat are in a third prescribed reference table;

wherein a second set of objects of said first type resulting after removal of said second objects of said first type and said third objects of said first type from said first set of objects of said first type is defined as garbage.

26. The apparatus as defined in claim 25 further including means for removing said second set of objects of said first type, whereby memory in a database is reclaimed.

27. The apparatus as defined in claim 26 wherein said objects in said first set of objects of said first type are identified as potential garbage, and further including means for inserting representations of said objects in said first set of objects of said first type in third prescribed reference table.

28. The apparatus as defined in claim 27 wherein said pointers pointing to objects in said third prescribed reference table have strengths, and further including means for updating prescribed pointer strengths to ensure that every object visited in said third prescribed reference table has at least one strong pointer referring to it.

29. The apparatus as defined in claim 28 wherein each of said objects has a strength bit associated with it and each of said pointers has a strength bit associated with it, and wherein a pointer is defined as being strong when the strength bit associated with said pointer is strong and the strength bit associated with an object that the pointer is pointing to is strong, otherwise the pointer is defined as being weak.

30. The apparatus as defined in claim 29 further including means for determining if a representation of an object to be traversed is in said third prescribed reference table and, means responsive to an indication that said object to be traversed is not in said third prescribed reference table for inserting a representation of said object to be traversed in said third prescribed reference table.

31. The apparatus as defined in claim 30 wherein said third prescribed reference table includes first, second, third and fourth reference count stores and Her including means for setting a count in each of said first and second reference count stores to zero when an object is inserted into said third prescribed reference table, and means for inserting current values of fifth and sixth reference counts for said object being inserted into said third prescribed reference table in said third and fourth reference count stores, respectively.

32. The apparatus as defined in claim 31 wherein means responsive to the insertion of the representation of an object in said third prescribed reference table for updating counts in said first and third reference count stores, and means responsive to the strength of a pointer pointing to said object is strong and the reference counts in said first and third reference count stores being equal for indicating that said pointer is the last strong pointer to said object.

33. The apparatus as defined in claim 32 wherein said means removing representations of objects from said first set of objects of said first type removes a representation of an object being pointed to in said third prescribed reference table and is of said first type, and further including means for converting a weak pointer pointing to said object represented in said third reference table to being strong, and said means for updating reference counts for said object being pointed to updates said counts.

34. The apparatus as defined in claim 32 wherein said means removing representations of objects from said first set of objects of said first type removes a representation of an object being pointed to in said third prescribed reference table and is of said first type, and Her including means for convening a strong pointer pointing to said object represented in said third reference table to being weak, and said means for updating reference counts for said object being pointed to updates said counts.

35. Apparatus for use in removing garbage in an object oriented database in a computer system including at least one server and one or more client positions associated with a server, the apparatus comprising:

said at least one server including
means for determining if there are first objects not marked of a first type in a first prescribed reference table but not in a second prescribed reference table;
means for marking said first objects as said first type;
means for determining prescribed objects pointed to by said marked first objects such that pointers from said marked first objects to said prescribed objects are strong;
means for determining all strong pointers to each of said prescribed objects;
means for determining the last of said strong pointers from said marked first objects to said prescribed objects;
whereby a first set is obtained of objects of said first type
means at said one or more client positions for determining that all currently executing transactions have been completed;
means responsive to an indication that execution of said transactions has been completed for determining and for removing from said first set of objects of said first type, second objects of said first type that are pointed to from objects other than said first type;
means responsive to an indication that execution of said transactions has been completed for determining and for removing from said first set of objects of said first type, third objects of said first type that are in a third prescribed reference table;
wherein a second set of objects of said first type resulting after removal of said second objects of said first type and said third objects of said first type from said first set of objects of said first type is defined as garbage.

36. The apparatus as defined in claim 35 further including means for removing said second set of objects of said first type, whereby memory in a database is reclaimed.

37. The apparatus as defined in claim 36 wherein said objects in said first set of objects of said first type are identified as potential garbage, and further including means for inserting representations of said objects in said first set of objects of said first type in a third prescribed reference table.

38. The apparatus as defined in claim 37 wherein said pointers pointing to objects in said third prescribed reference table have strengths, and former including means for updating prescribed pointer strengths to ensure that every object visited in said third prescribed reference table has at least one strong pointer referring to it.

* * * * *